United States Patent
Miki et al.

(10) Patent No.: US 8,739,648 B2
(45) Date of Patent: Jun. 3, 2014

(54) BICYCLE CONTROL DEVICE

(75) Inventors: Yoshimitsu Miki, Osaka (JP); Satoshi Shahana, Osaka (JP)

(73) Assignee: Shimano Inc., Osaka (JP)

( * ) Notice: Subject to any disclaimer, the term of this patent is extended or adjusted under 35 U.S.C. 154(b) by 2132 days.

(21) Appl. No.: 11/756,712

(22) Filed: Jun. 1, 2007

(65) Prior Publication Data

US 2008/0295638 A1 Dec. 4, 2008

(51) Int. Cl.
   *F16C 1/10* (2006.01)

(52) U.S. Cl.
   USPC .............................. 74/502.2; 74/488; 74/489

(58) Field of Classification Search
   USPC ........... 74/502.2, 488, 489, 501.6; 188/24.11, 188/24.22, 24.19, 2 D
   See application file for complete search history.

(56) References Cited

U.S. PATENT DOCUMENTS

| | | | |
|---|---|---|---|
| 4,532,825 A | 8/1985 | Nagano | |
| 4,995,280 A | 2/1991 | Tagawa | |
| 5,094,120 A | 3/1992 | Tagawa | |
| 5,257,683 A | 11/1993 | Romano | |
| 5,303,608 A * | 4/1994 | Iwasaki | 74/502.2 |
| 5,400,675 A | 3/1995 | Nagano | |
| 5,479,776 A * | 1/1996 | Romano | 74/502.2 |
| 5,768,945 A * | 6/1998 | Ose | 74/489 |
| 6,155,132 A | 12/2000 | Yamane | |
| 6,389,925 B1 * | 5/2002 | Ose | 74/502.2 |
| 6,810,764 B2 | 11/2004 | Chen | |
| 7,100,471 B2 * | 9/2006 | Irie et al. | 74/502.2 |
| 7,194,928 B2 | 3/2007 | Kawakami | |
| 7,219,573 B2 * | 5/2007 | Dal Pra' | 74/502.2 |
| 7,437,969 B2 * | 10/2008 | Ose | 74/502.2 |
| 7,665,384 B2 * | 2/2010 | Sato et al. | 74/502.2 |
| 8,272,293 B2 * | 9/2012 | Miki et al. | 74/502.2 |
| 2002/0020246 A1 * | 2/2002 | Campagnolo | 74/502.2 |
| 2004/0163486 A1 * | 8/2004 | Irie et al. | 74/502.2 |
| 2007/0245847 A1 * | 10/2007 | Chen | 74/502.2 |
| 2008/0210040 A1 * | 9/2008 | Orrico et al. | 74/502.2 |
| 2008/0295635 A1 * | 12/2008 | Sato et al. | 74/479.01 |
| 2009/0114051 A1 * | 5/2009 | Miki | 74/489 |

FOREIGN PATENT DOCUMENTS

| | | |
|---|---|---|
| EP | 0 504 118 A1 | 9/1992 |
| EP | 1 264 765 A1 | 12/2002 |
| EP | 1 449 756 A1 | 8/2004 |
| EP | 1 535 829 A2 | 6/2005 |
| EP | 1 728 714 A2 | 12/2006 |
| JP | 3283289 B2 | 3/2002 |

OTHER PUBLICATIONS

Campagnolo 11 Speed Ergopower Ultra-shift Control Levers.*

* cited by examiner

*Primary Examiner* — Vinh Luong
(74) *Attorney, Agent, or Firm* — Global IP Counselors, LLP

(57) ABSTRACT

A bicycle control device is basically provided with a base member, a shift control unit and an operating lever. The base member includes a handlebar mounting structure defining a handlebar receiving area with a central handlebar mounting axis. The shift control unit is mounted to the base member. The operating lever is pivotally mounted relative to the base member to pivot from a rest position towards the handlebar receiving area about a non-shift operating pivot axis that is angled relative to the handlebar receiving area such that the operating lever moves along a non-shift operating path that avoid interference with a handlebar in a lateral direction with respect to the handlebar receiving area.

19 Claims, 12 Drawing Sheets

BICYCLE CONTROL DEVICE

BACKGROUND OF THE INVENTION

1. Field of the Invention

This invention generally relates to a bicycle control device for operating a bicycle component. More specifically, the present invention relates to a bicycle control (component actuating) device that has a shift operating member movable in a non-shift operating path towards the handlebar.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle, especially the bicycle control devices for performing shifting and braking operations.

Typically, bicycle shifters mechanically operate derailleurs via cables, while bicycle brake levers mechanically operate brake devices via cables. In either case, an operating force is typically applied by one of the rider's fingers to operate a control lever, which in turn transmitted the operating force to the drive component of a bicycle shifting mechanism by a cable that was fixed at one end to the control lever. Currently, many different types of control devices exist for performing shifting and braking operations.

Sometimes the bicycle shifter and the bicycle brake lever are combined as a single integrated unit, while other times they are separate individual units. In the case of road bikes with drop type handlebars, the bicycle shifter and the bicycle brake lever are often combined as a single integrated control device. In some cases, a braking function and a shifting function is performed by a single dual function lever, One example of this type of control device is disclosed in U.S. Pat. No. 5,400,675 to Nagano (assigned to Shimano, Inc). More typically, one or two shift levers are provided in addition to the brake lever. One example of this type of control device is disclosed in U.S. Pat. No. 5,257,683 to Romano (assigned to Campagnolo). While these types of control devices work well, it is desirable to provide a bicycle control (component actuating) device that has a shift operating member that is movable in a non-shift operating path towards the handlebar but avoids interference with the handlebar.

In view of the above, it will be apparent to those skilled in the art from this disclosure that there exists a need for an improved bicycle component actuating device. This invention addresses this need in the art as well as other needs, which will become apparent to those skilled in the art from this disclosure.

SUMMARY OF THE INVENTION

One object of the present invention is to provide a control (component actuating) device that has a shift operating member that is movable in a non-shift operating path towards the handlebar but avoids interference with the handlebar.

The foregoing objects can basically be attained by providing a bicycle control device that basically comprises a base member, a shift control unit and a operating lever. The base member includes a handlebar mounting structure defining a handlebar receiving area with a central handlebar mounting axis. The shift control unit is mounted to the base member. The operating lever is pivotally mounted relative to the base member to pivot from a rest position towards the handlebar receiving area about a non-shift operating pivot axis that is angled relative to the handlebar receiving area such that the operating lever moves along a non-shift operating path that avoid interference with a handlebar in a lateral direction with respect to the handlebar receiving area.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
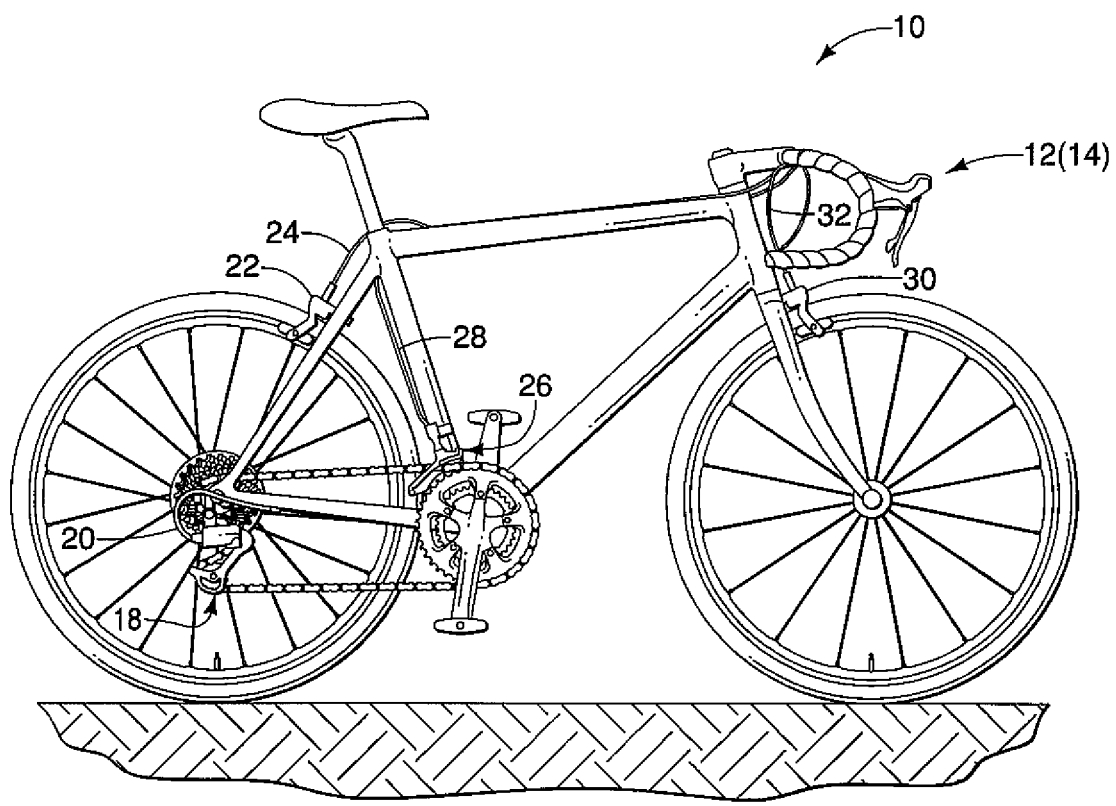
FIG. 1 is a side elevational view of bicycle equipped with a pair of bicycle component actuating (brake/shift) devices (only one shown) coupled to a drop type handlebar in accordance with a preferred embodiment of the present invention.
Figure 2:
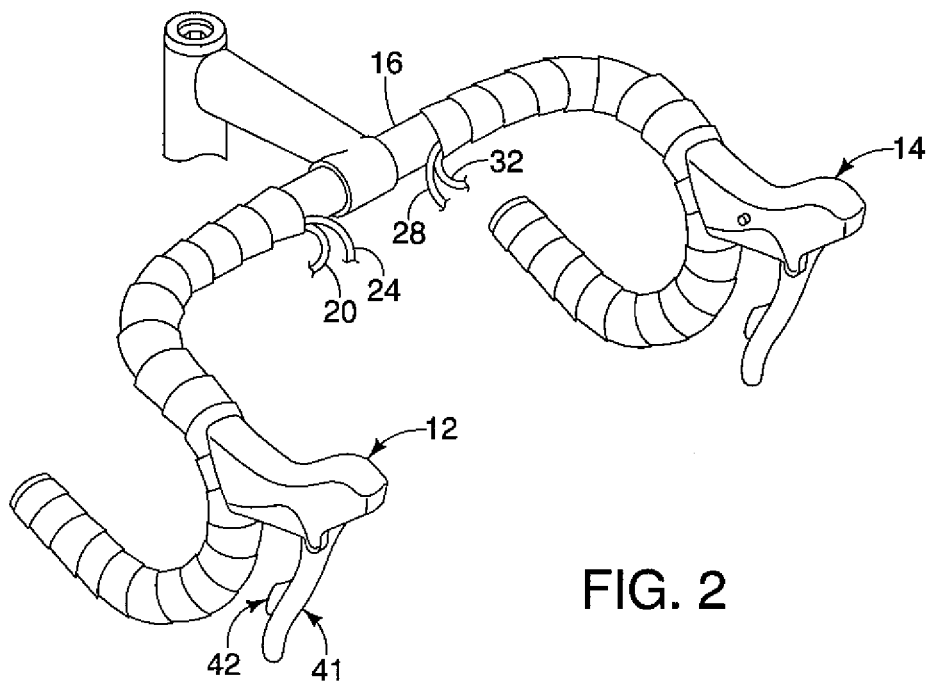
FIG. 2 is an enlarged partial perspective view of the drop type handlebar with the pair of bicycle component actuating (brake/shift) devices in accordance with the illustrated embodiment of the present invention.

Referring initially to FIGS. 1 and 2, a bicycle 10 is illustrated in accordance with a pair of bicycle control devices 12 and 14 mounted on a bicycle handlebar 16 in accordance with one embodiment of the present invention. The bicycle control device 12 is a right hand side control device operated by the rider's right hand, while the bicycle control device 14 is a left hand side control device operated by the rider's left hand. In the illustrated embodiment, the bicycle control device 12 is operatively coupled to a rear derailleur 18 via a shift control cable 20 and a rear brake device 22 via a brake control cable 24. The bicycle control device 14 is operatively coupled to a front derailleur 26 via a shift control cable 28 and a front brake device 30 via a brake control cable 32. Alternatively, the bicycle control devices 12 and 14 can be switched so that the rider can operate the rear derailleur 18 and the front derailleur 26 with opposite hands and/or operate the rear and front brake devices 22 and 30 with opposite hands. In the illustrated embodiment, the left hand side bicycle control device 14 is substantially identical to the right hand side bicycle control device 12, except for the shifting unit has been modified to reduce the number of gears that can be shifted. In any event, the left hand side bicycle control device 14 is essentially identical in construction and operation to the right hand side bicycle control device 12, except that the left hand side bicycle control device 14 is a mirror image of the right hand side bicycle control device 12 and the number of shift positions for the left hand side bicycle control devices 12 and 14 are different. Thus, only the right hand side bicycle control device 12 will be discussed and illustrated herein. Preferably, the cables 20, 24, 28 and 32 are conventional bicycle control cables that have an outer casing the covers an inner wire.

Figure 3:
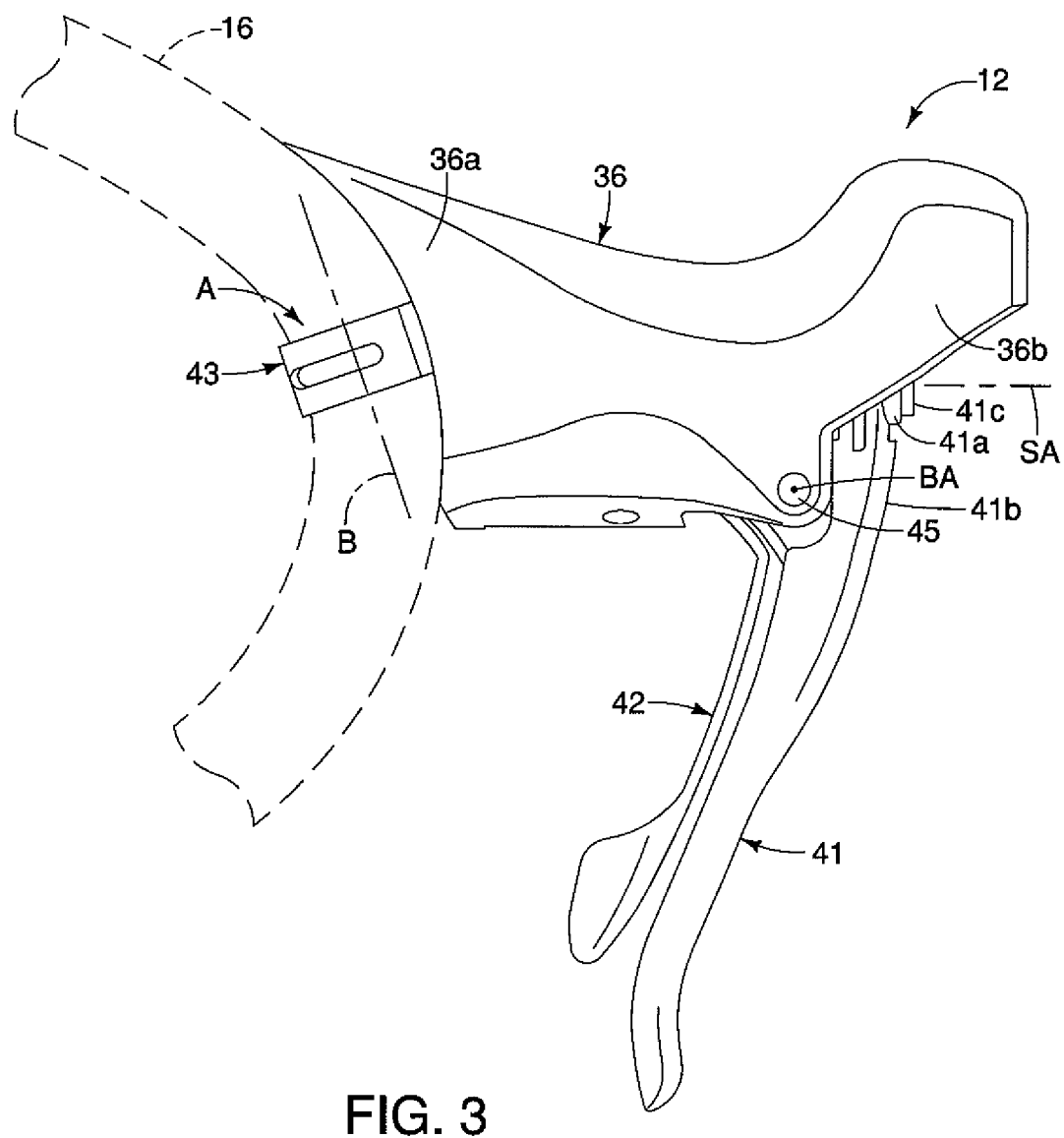
FIG. 3 is an outside elevational view of the right bicycle component actuating (brake/shift) device with the first and second operating levers in the rest positions.
Figure 4:
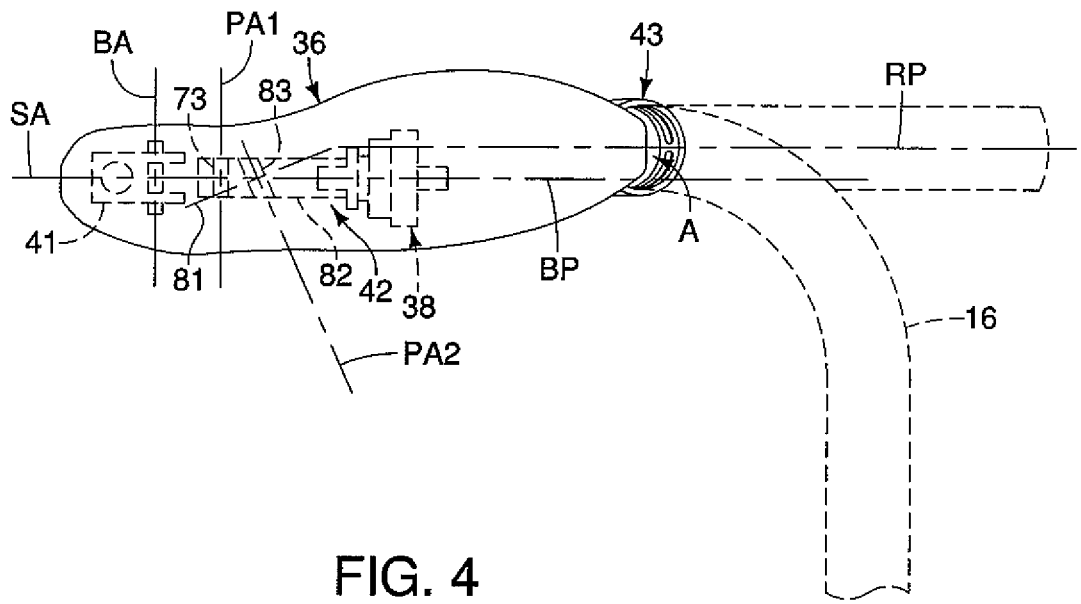
FIG. 4 is a simplified top plan view of the right bicycle component actuating (brake/shift) device with the first and second operating levers in the rest positions to show the pivot axes of the first and second operating levers.
Figure 5:
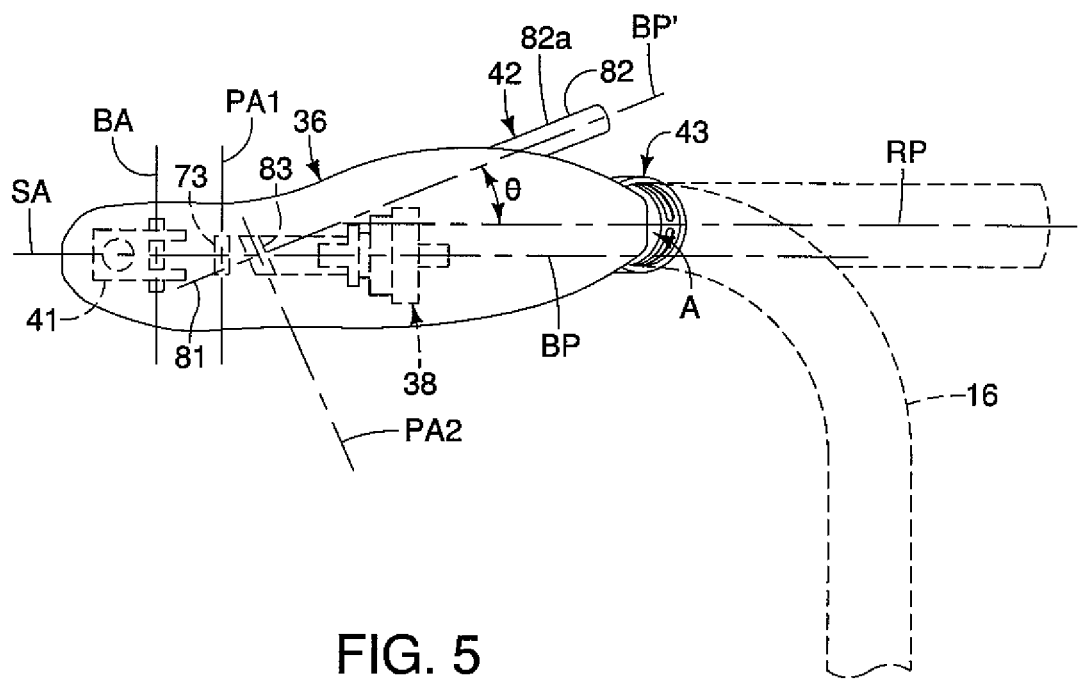
FIG. 5 is a simplified top plan view, similar to FIG. 4, of the right bicycle component actuating (brake/shift) device, but with the first and second operating levers moved to non-shifting positions.
Figure 6:
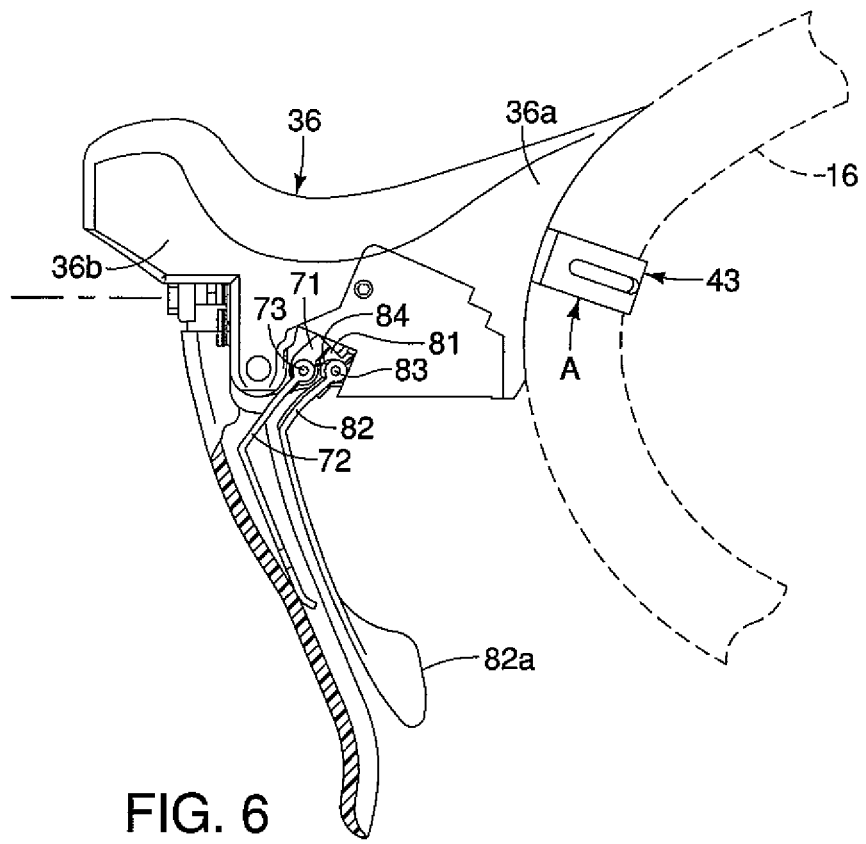
FIG. 6 is an inside elevational view of the right bicycle component actuating (brake/shift) device with the first and second operating levers in the rest positions.
Figure 7:
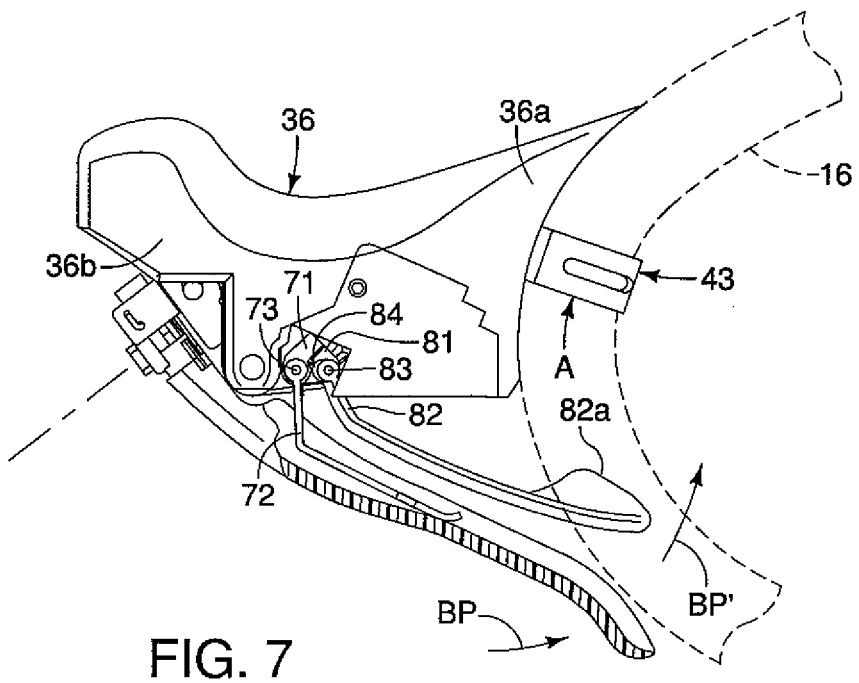
FIG. 7 is an inside elevational view, similar to FIG. 6, of the right bicycle component actuating (brake/shift) device, but with the first and second operating levers moved to non-shifting positions.
Figure 8:
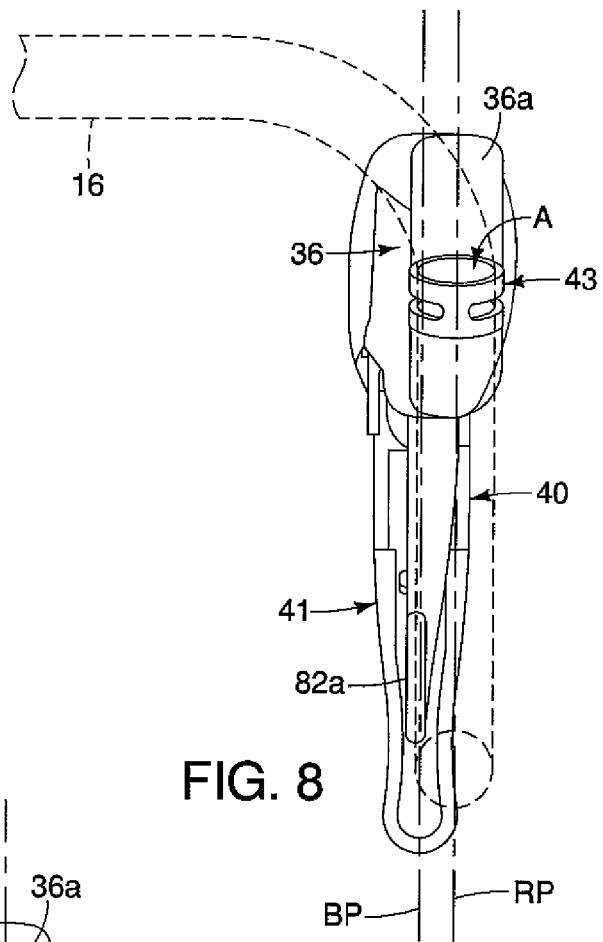
FIG. 8 is a rear side elevational view of the right bicycle component actuating (brake/shift) device with the first and second operating levers in the rest positions.
Figure 9:
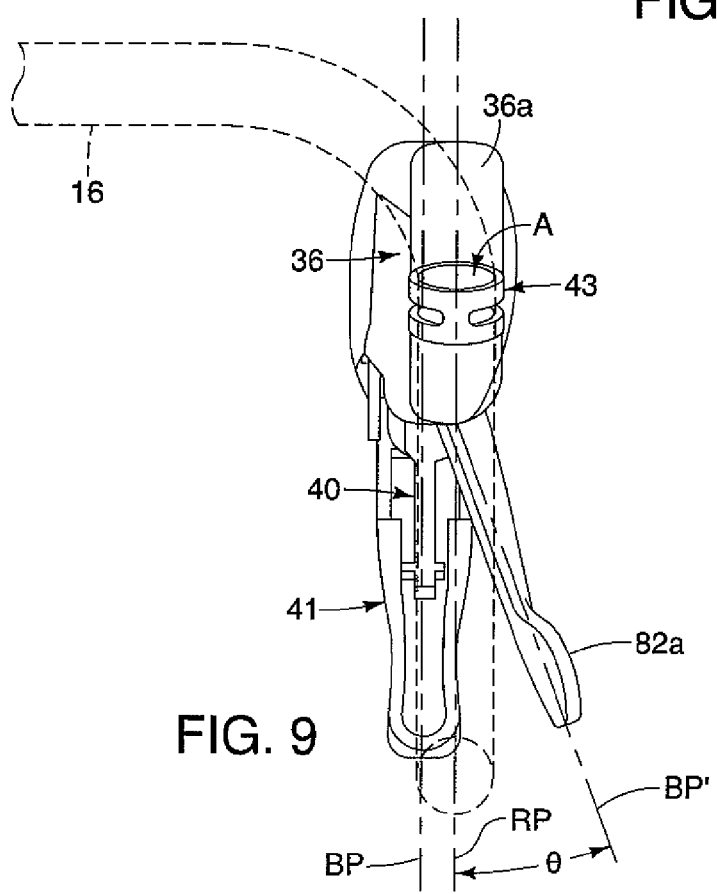
FIG. 9 is rear side elevational view, similar to FIG. 8, of the right bicycle component actuating (brake/shift) device with the first and second operating levers moved to non-shifting positions.
Figure 12:
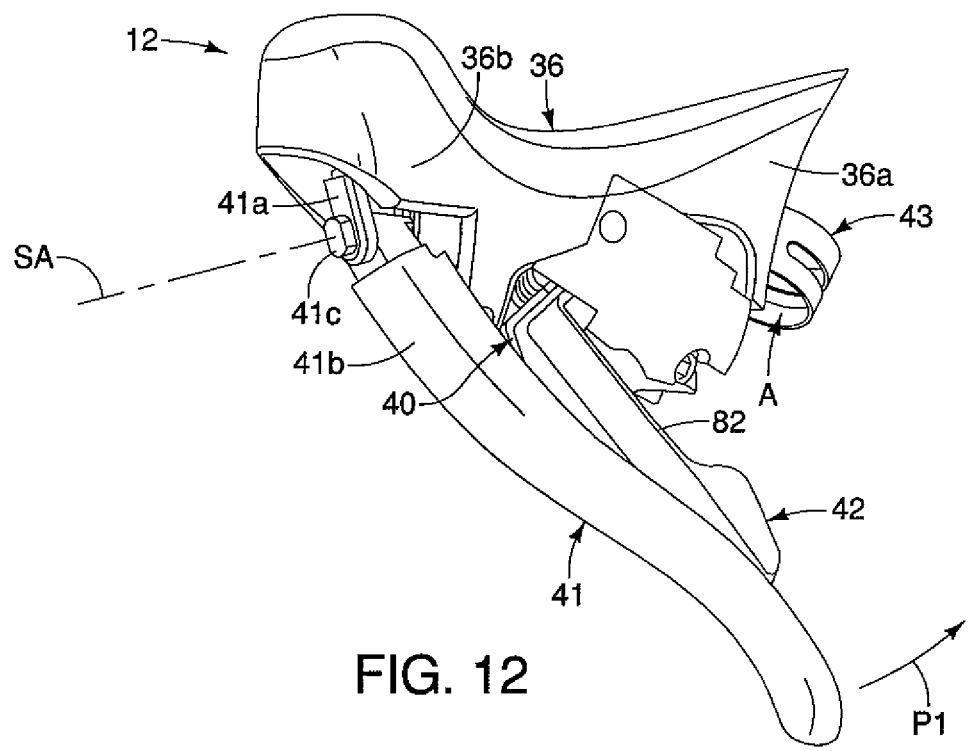
FIG. 12 is an inside perspective view of the right bicycle component actuating (brake/shift) device with the first operating lever moved to a shifting position such that the second operating lever moves with the first operating lever.

Referring now to FIGS. 3 and 12, the bicycle control device 12 basically includes a base member 36, a shift control unit 38, a control member 40, a first operating (brake/shift) lever 41 and a second operating (shift) lever 42. The first operating lever 41 is a dual function operating lever that performs a braking operation in addition to a shifting operation. Thus, the bicycle control device 12 is configured and arranged to perform both a braking operation and a shifting operation as a single integrated unit that is mounted to the handlebar 16. In the illustrated embodiment, the first operating lever 41 is configured and arranged to perform a wire pulling operation and a braking operation, while the second operating lever 42 is configured and arranged to perform a wire releasing operation. The second operating lever 42 is located behind the first operating lever 41, when the first and second operating levers 41 and 42 are in rest positions. The first and second operating levers 41 and 42 are aligned in a movement plane or path BP of the first operating lever 41, when the first and second operating levers 41 and 42 are in rest positions.

The base member 36 includes a main body having a first end section 36a with a handlebar mounting structure 43 and a second end section 36b remotely disposed from the first end section 36a. The first and second operating levers 41 and 42 are located at the second end section 36 of the main body. The base member 36 is fixedly mounted to the handlebar 16 by the handlebar mounting structure 43, which defines a handlebar receiving area A with a central handlebar mounting axis B. The handlebar mounting structure 43 is preferably a conventional band clamp or similar structure.

As seen in FIGS. 4 to 7, the first operating lever 41 is pivotally mounted relative to the base member 36 about a brake lever pivot axis BA for performing the braking operation. The first operating lever 41 pivots from a rest position to a braking position along the movement plane or path BP which intersects with the handlebar receiving area A. On the other hand, as explained below, at least part of the second operating lever 42 is pivotally mounted relative to the base member 36 to pivot from a rest position to a retracted position along a non-shift operating plane or path BP', in which at least a finger contact portion 82a of the second operating lever 82 is laterally offset from the handlebar receiving area A to avoid interference with the handlebar 16. The non-shift operating path BP' of the second operating lever 42 is angled with respect to a reference plane RP that is perpendicular to the brake lever pivot axis BA and that contains the central handlebar mounting axis B. Thus, a free end of the second operating lever 42 or the finger contact portion 82a avoids interference with the handlebar 16 in a lateral direction with respect to the handlebar receiving area A when the second operating lever 42 is moved rearwardly toward the handlebar 16, for example due to the rearward movement of the first operating lever 41. When the second operating lever 42 is in the retracted position, the free end of the second operating lever 42 is located on the laterally outer side of the reference plane RP, which is opposite to the direction of movement of the second operating lever 42 from the rest position to a shift position along a second (shift) operating plane or path P2. Moreover, the non-shift operating path BP' of the second operating lever 42 is illustrated as forming about a twenty degree angle with respect to the reference plane RP. However, the angle formed between the reference plane RP and the non-shift operating path BP' of the second operating lever 42 can range up to forty five degrees on either side of the reference plane RP. Thus, the free end of the second operating lever 42 can be located on the same side of the reference plane RP as the direction of movement of the second operating lever 42 from the rest position to the shift position.

In the illustrated embodiment, the shift control unit 38 is a cable operating device that includes a wire takeup member 51. The wire takeup member 51 is attached to the inner wire of the shift control cable 20 to pull and release the inner wire of the shift control cable 20 in response to operation of the first and second operating levers 41 and 42, respectively. The first operating lever 41 is operatively coupled to the shift control unit 38 via the control member 40 to operate the shift control unit 38 (mainly, the wire take-up member 51) in a first operating direction D1 or a wire pulling direction about a main pivot shaft 44 of the shift control unit 38. The second operating lever 42 is operatively coupled to the shift control unit 38 to operate the shift control unit 38 (mainly, the wire takeup member 51) in a second operating direction D2 or a wire releasing direction about the main pivot shaft 44 of the shift control unit 38.

The first operating lever 41 preferably includes a mounting part 41a and an operating part 41b with the operating part 41b pivotally mounted to the mounting part 41a by a pivot pin 41c about a shift operating axis SA. The mounting part 41a of the first operating lever 41 is also movably coupled relative to the base member 36 by a pivot pin 45 about the brake lever pivot axis BA for performing the braking operation. Thus, the operating part 41b of the first operating lever 41 is movably coupled to mounting part 41a (i.e., relative to the base member 36) to move along a first (shift) operating plane or path P1 and movably coupled relative to the base member 36 to move along a non-shift (brake) operating plane or path BP that is non-coincident with the first operating plane or path P1. The operating part 41b is biased about the pivot pin 41c to a rest position with respect the first operating plane or path P1 by a biasing element 41d. Ball and recess type positioning mechanism 41e is attached to the mounting part 41a to maintain the operating part 41b of the first operating lever 41 in the rest position. The first operating lever 41 is operatively coupled to the shift control unit 38 via the control member 40 to operate the wire takeup member 51 of the shift control unit 38 in the first operating direction D1 as explained below. The first operating lever 41 is slidably engaged with the control member 40 such that the control member 40 is moved when the first operating lever 41 is moved along the non-shift (brake) operating path BP with sliding contact therebetween. As discussed below, at least part of the control member 40 pivots about a non-shift operating pivot axis PA1 when the first operating (brake) lever 41 is moved along the non-shift (brake) operating path BP. This movable part of the control member 40 generally moves with the first operating (brake) lever 41 along the non-shift (brake) operating path BP.

The second operating lever 42 is configured such that at least a part of the second operating lever 42 pivots about a non-shift operating pivot axis PA2 when the first operating (brake) lever 41 is moved along the non-shift (brake) operating path BP. This movable part of the second operating lever 42 moves along the non-shift operating path BP' that is angled with respect to the reference plane RP that is perpendicular to the brake lever pivot axis BA and that contains the central handlebar mounting axis B. Thus, the non-shift operating pivot axis PA2 is non-parallel to the brake lever pivot axis BA. The second operating lever 42 is also independently movable with respect to the first operating (brake) lever 41. Thus, a rider can pivot the second operating lever 42 along the non-shift operating path BP' in a direction primarily toward the handlebar receiving area A but with the second operating lever 42 laterally avoiding intersection with the handlebar receiving area A as the second operating lever 42 moves along the non-shift operating path BP' from the rest position to the retracted (operated) position, while the first operating (brake) lever 41 remains in the rest position and then operate the second operating lever 42 along the second operating plane or path P2. The non-shift operating path BP' may also be referred to as the first operating path, and the non-shift operating pivot axis PA2 may also be referred to as the first pivot axis. Likewise, the non-shift operating plane BP' may also be referred to as the first plane. The second operating lever 42 is also operatively coupled to the shift control unit 38 to move along the second operating plane or path P2 to operate the wire takeup member 51 of the shift control unit 38 in the opposite (second) operating direction D2 from the first operating direction D1 due to operation of the first operating lever 41. The second operating lever 42 and the control member 40 pivot about a coincident pivot axis when performing shifting operations as explained below.

Thus, the first and second operating levers 41 and 42 are coupled relative to the base member 36 to move along first and second operating planes P1 and P2, respectively, that intersect with the non-shift (brake) operating plane or path BP (movement plane) of the first operating lever 41. The non-shift (brake) operating plane or path BP (movement plane) of the first operating lever 41 is perpendicularly oriented with respect to the first and second operating planes or paths P1 and P2 of the first and second operating levers 41 and 42.

The second operating lever 42 is movable along the non-shift operating path BP' independent from the first operating (brake) lever 41. The non-shift operating path BP' of the second operating lever 42 is arranged such that the free end of the second operating lever 42 is located on a first lateral side of the reference plane RP of the base member 36 when the second operating lever 42 is moved from the rest position towards the handlebar receiving area A or the handlebar 16 along the non-shift operating path BP' of the second operating lever 42. The second operating path P2 of the second operating lever 42 is arranged such that the second operating lever 42 is located on a second lateral side of the reference plane RP of the base member 36 that is opposite the first lateral side when the second operating lever 42 is moved from the rest position along the second operating path P2 of the second operating lever 42. However, it will be apparent to those skilled in the art that the non-shift operating path BP' of the second operating lever 42 can lie on the opposite side of the reference plane than shown in FIG. 4. In either case, the non-shift operating path BP' of the second operating lever 42 lies along a plane that forms an angle θ that is less than forty-five degrees (about twenty degrees is shown) as measured from the reference plane to the non-shift operating plane or path BP' of the second operating lever 42. If this angle θ is outside of this range, the operation of the second operating lever 42 may become too uncomfortable for the rider or interfere with other parts of the bicycle. Preferably, the angle θ is in the range of less than thirty-five degrees, and more preferably less than twenty-five degrees.

Thus, the angle θ is set such that the second operating lever 42 pivots about a non-shift operating pivot axis PA2 relative to the base member 26 from the rest position towards the handlebar receiving area A so as to avoid interference with the handlebar 16 in the lateral direction with respect to the handlebar receiving area A. The non-shift operating pivot axis PA1 forms an angle relative to the reference plane such that the first operating lever 41 moves along the non-shift operating path BP. Accordingly, the non-shift operating path BP' of the second operating lever 42 is angled with respect to the reference plane RP, which is perpendicular to the brake lever pivot axis BA and which contains the central handlebar mounting axis B.

Now referring to FIGS. 10 to 17, the movements of the first and second operating levers 41 and 42 will now be generally discussed with respect to the base member 36 that is configured to be fixedly mounted to the handlebar 16 by the handlebar mounting structure 43.

Figure 10:
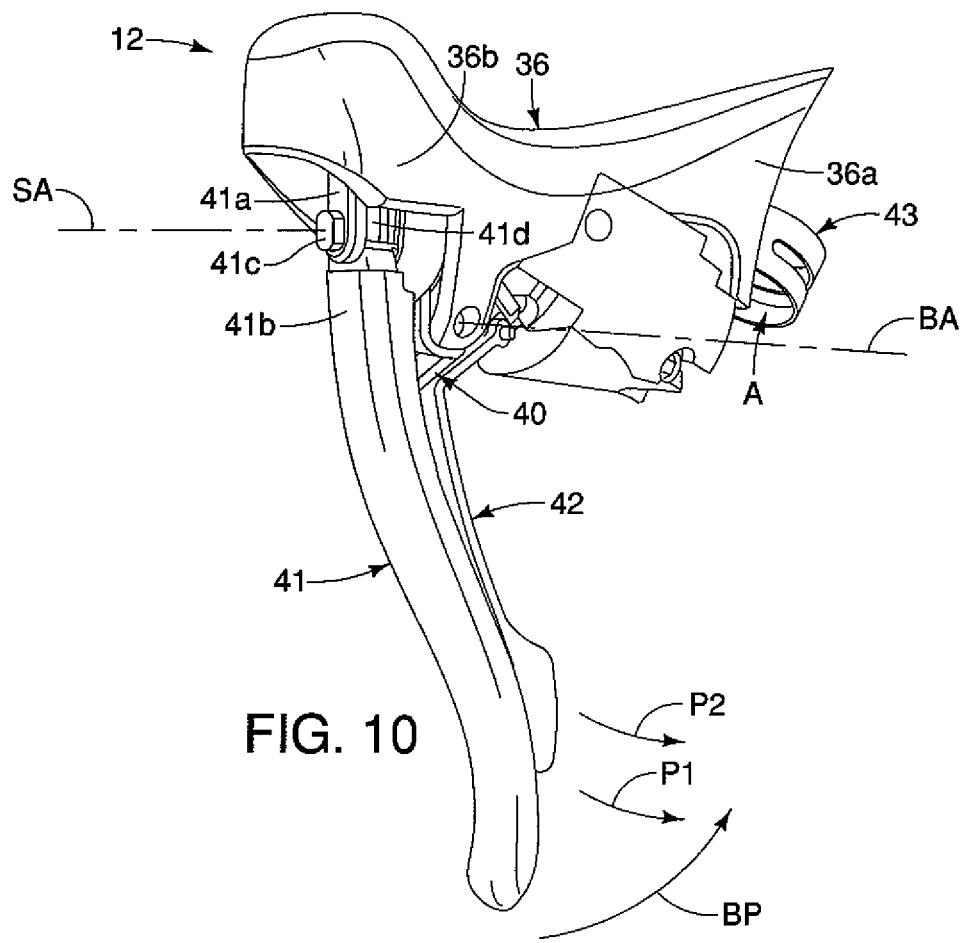
FIG. 10 is an inside perspective view of the right bicycle component actuating (brake/shift) device with the first and second operating levers in the rest positions.
Figure 11:
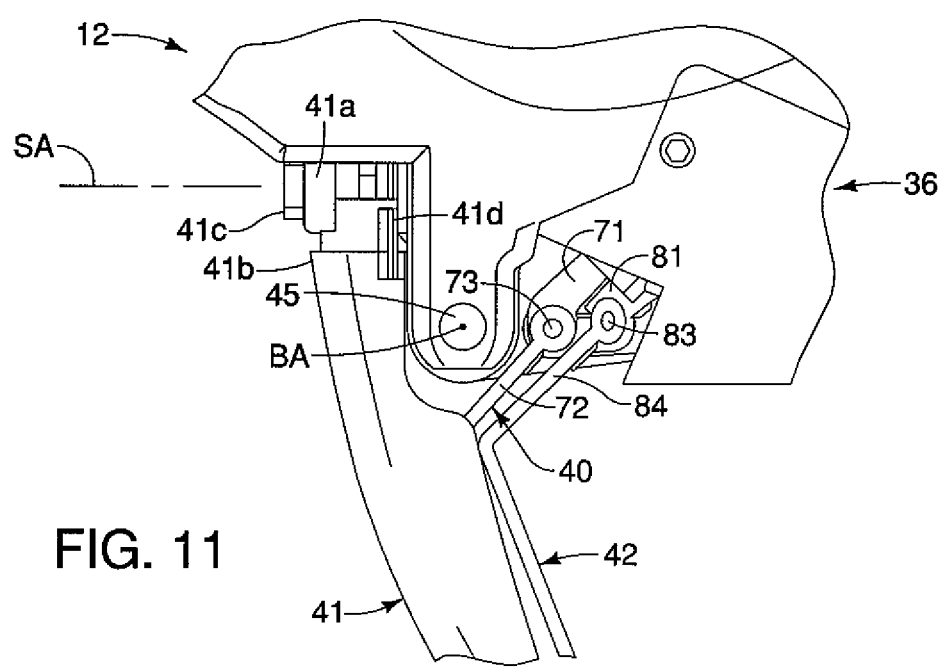
FIG. 11 is an enlarged partial inside elevational view of the right bicycle component actuating (brake/shift) device with the first and second operating levers in the rest positions.

As seen in FIGS. 10 and 11, in this illustrated embodiment, the first and second operating levers 41 and 42 are configured and arranged relative to each other such that they are aligned in the non-shift (brake) operating path BP to move in the non-shift (brake) operating path BP. In particular, the second operating lever 42 is located behind the first operating lever 41. The control member 40 contacts the rearward facing side of the first operating lever 41 and is located between the first and second operating levers 41 and 42.

As seen in FIGS. 10 to 13, in this illustrated embodiment, the first operating lever 41 is configured and arranged to pivot in a first rotational direction with respect to the base member 36 from the rest position of the first operating lever 41. The second operating lever 42 is configured and arranged to pivot in a second rotational direction with respect to the base member 36 from the rest position of the second operating lever 42, with the first and second rotational directions being directions toward a central longitudinal plane of the bicycle 10. The first and second operating levers 41 and 42 are configured and arranged relative to each other such that the second operating lever 42 is moved by the first operating lever 41 when the first operating lever 41 is operated to move the wire takeup member 51 of shift control unit 38 in the first operating direction D1 about the main pivot shaft 44 of the shift control unit 38. In other words, when a wire pulling operation is desired, the rider pushes the first operating lever 41 in a direction transverse to a center plane of the base member 36 along the first operating plane or path P1 from the first (rest) position (FIGS. 10 and 11) to a second (shifting) position (FIGS. 12 and 13) to operate the shift control unit 38. This movement of the first operating lever 41 operates the wire takeup member 51 of shift control unit 38 via the control member 40 in the first operating direction D1 which is a wire pilling operation in the illustrated embodiment. As mentioned above, the second operating lever 42 moves with the first operating lever 41 as the first operating lever 41 is moved from the first (rest) position to the second (shifting) position to operate the shift control unit 38.

As seen in FIGS. 10, 11, 14 and 15, in this illustrated embodiment, the first and second operating levers 41 and 42 are configured and arranged relative to each other such that the first operating lever 41 remains stationary when the second operating lever 42 is operated to move the wire takeup member 51 of shift control unit 38 in the second operating direction D2 about the main pivot shaft 44 of the shift control unit 38. In other words, when a wire releasing operation is desired, the rider pushes the second operating lever 42 in a direction transverse to a center plane of the base member 36 along the second operating plane or path P2 from a first (rest) position (FIG. 4) to a second (shifting) position (FIGS. 14 and 15) to operate the shift control unit 38. This movement of the second operating lever 42 operates the wire takeup member 51 of shift control unit 38 in the second operating direction D2 which is the wire releasing operation in the illustrated embodiment. As mentioned above, the second operating lever 42 moves independently with respect to the first operating lever 41 as the second operating lever 42 is moved from the first (rest) position to the second (shifting) position to operate the shift control unit 38.

Figure 16:
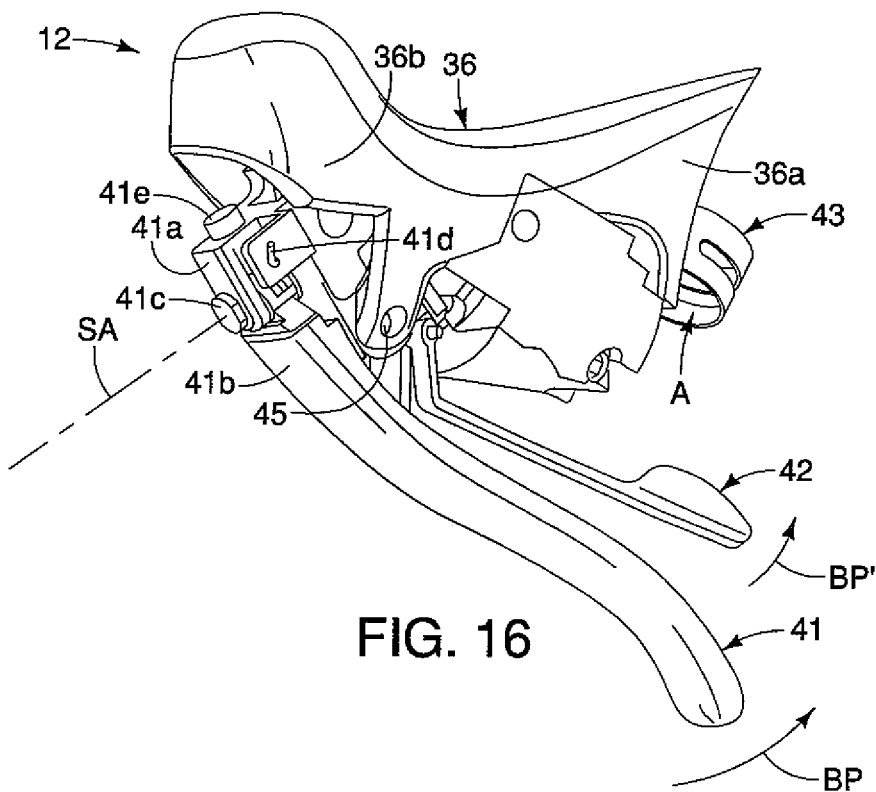
FIG. 16 is an inside elevational view of the right bicycle component actuating (brake/shift) device with the first operating lever moved to a braking (non-shift) position and the second operating lever moved to a non-shifting position by the first operating lever.
Figure 17:
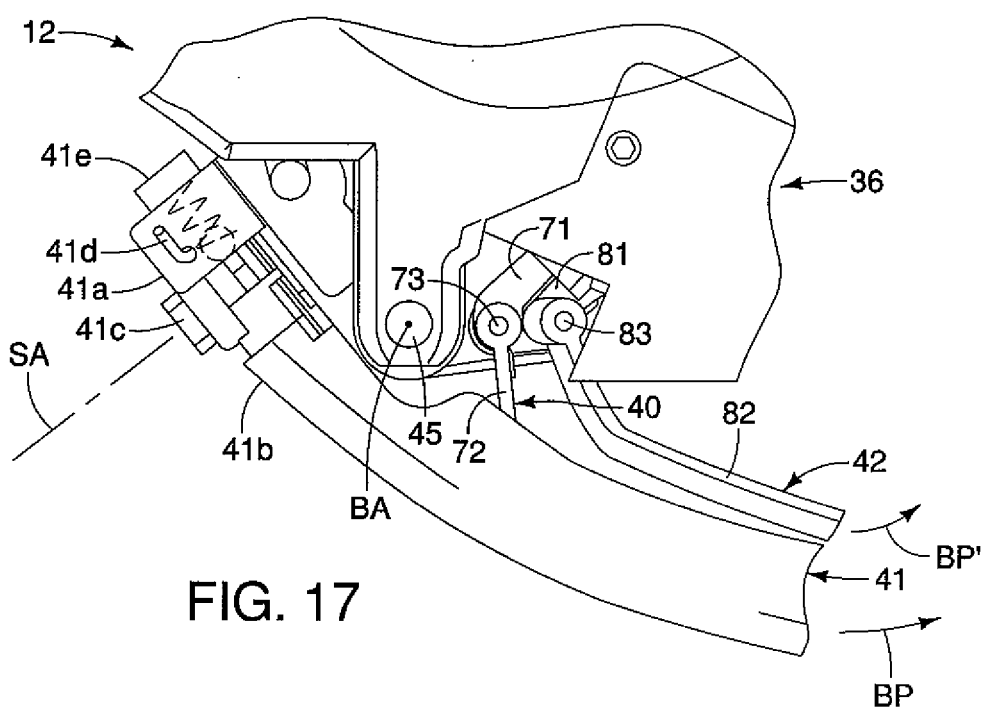
FIG. 17 is an inside perspective view of the right bicycle component actuating (brake/shift) device with the first operating lever moved to a braking (non-shift) position and the second operating lever moved to a non-shifting position by the first operating lever.

As seen in FIGS. 10, 11, 16 and 17, in the illustrated embodiment, the first operating lever 41 pivots about the pivot pin 45 between a first (rest) position (FIGS. 10 and 11) and a second (braking) position (FIGS. 16 and 17) along the non-shift (brake) operating plane or path BP. The non-shift (brake) operating plane or path BP also constitutes a movement plane such that the first operating lever 41 is pivotally coupled relative to the base member 36 about the pivot axis BA along the movement plane (BP). The movement of the first operating lever 41 from the rest position to the braking position results in the first and second operating levers 41 and 42 also being pivoted along the non-shift (brake) operating plane BP as seen in FIGS. 16 and 17.

Referring now to FIGS. 18 to 21, the shift control unit 38, the first operating lever 41 and the second operating lever 42 will now be discussed in more detail.

The shift control unit 38 is mounted to the base member 36 by a main pivot shaft 44. The shift control unit 38 is basically operated by the first and second operating levers 41 and 42 to pull or release the inner wire of the shift control cable 20. The shift control unit 38 is mounted to the base member 36 by the main pivot shaft 44 as mentioned above.

In addition to the wire takeup member 51, mentioned above, the shift control unit 38 further includes a winding plate or member 52, a winding pawl 53, a positioning plate or member 54, a pair of positioning pawls 55, a release plate or member 56 and a release pawl 57. The wire takeup member 51, the winding plate 52, the positioning plate 54 and the release plate 56 are all rotatably mounted on the main pivot shaft 44. The wire takeup member 51, the winding plate 52 and the positioning plate 54 are fixed together as an integrated unit so as to rotate together. The release plate 56 can rotate independently of the wire takeup member 51, the winding plate 52 and the positioning plate 54.

A return spring or biasing element 58 is preferably operatively coupled between the wire takeup member 51 and the base member 36 to urge the wire takeup member 51, the winding plate 52 and the positioning plate 54 in the wire releasing direction about the main pivot shaft 44. In the illustrated embodiment, the return spring or biasing element 58 is a torsion spring mounted on the main pivot shaft 44 with one end fixed to the wire takeup member 51 and the other end fixed to the base member 36.

A return spring or biasing element 59 is preferably operatively coupled between the second operating lever 42 and the control member 40 to urge the second operating lever 42 to the control member 40. In the illustrated embodiment, the return spring or biasing element 59 is a torsion spring mounted on the main pivot shaft 44 with one end fixed to the second operating lever 42 and the other end fixed to the control member 40 that is maintained in the rest position by the positioning mechanism 41*e*. Thus, the first and second operating levers 41 and 42 are normally maintained in the rest positions.

The first operating lever 41 is configured and arranged relative to the wire takeup member 51 such that the first operating lever 41 performs the wire pulling operation of the wire takeup member 51 when the first operating lever 41 is operated. The second operating lever 42 is configured and arranged relative to the wire takeup member 51 such that the second operating lever 42 performs the wire releasing operation of the wire takeup member 51 when the second operating lever 42 is operated.

Figure 18:
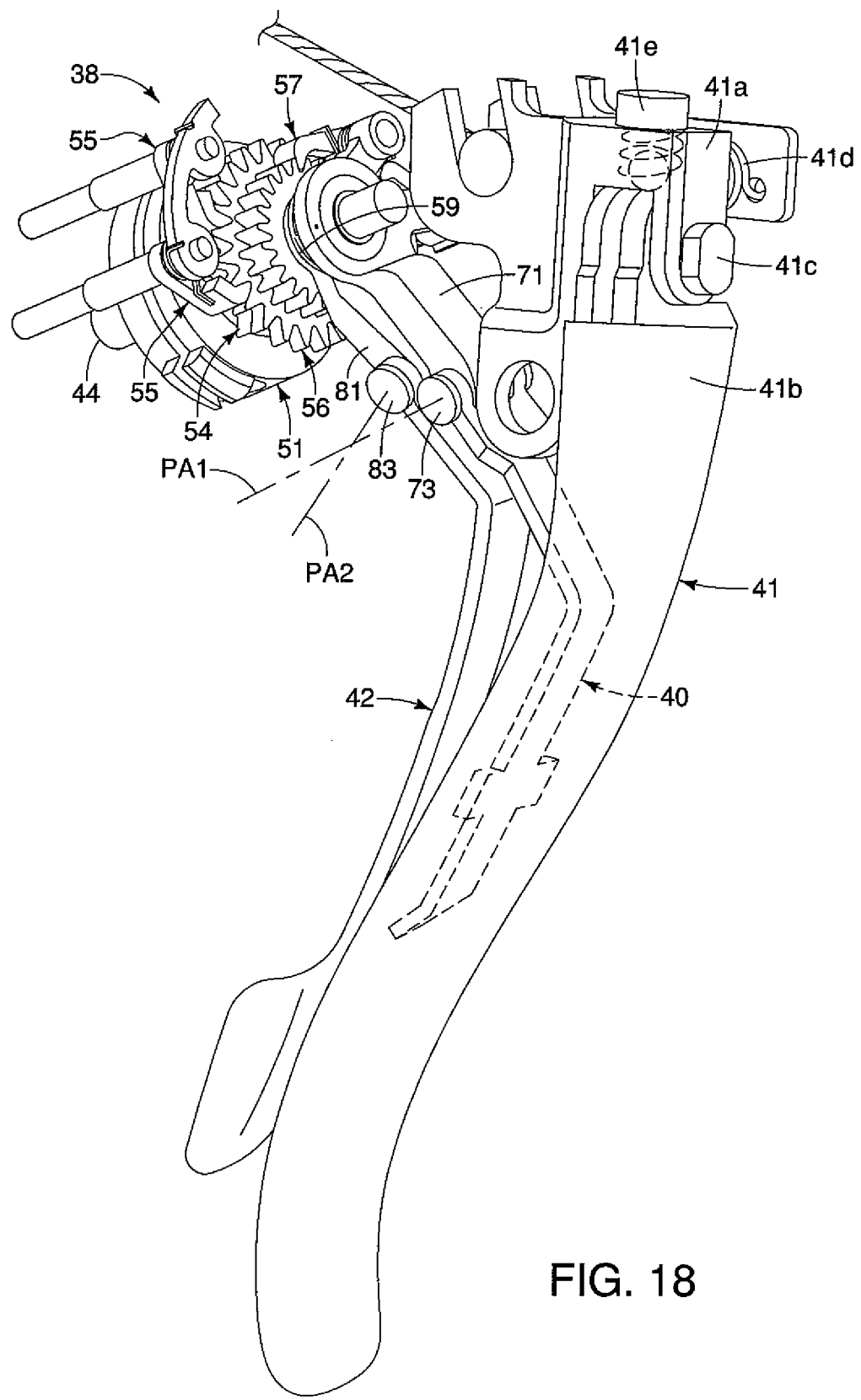
FIG. 18 is a partial perspective view of the shift control unit of the right bicycle component actuating (brake/shift) device with the first and second operating levers in the rest positions.
Figure 19:
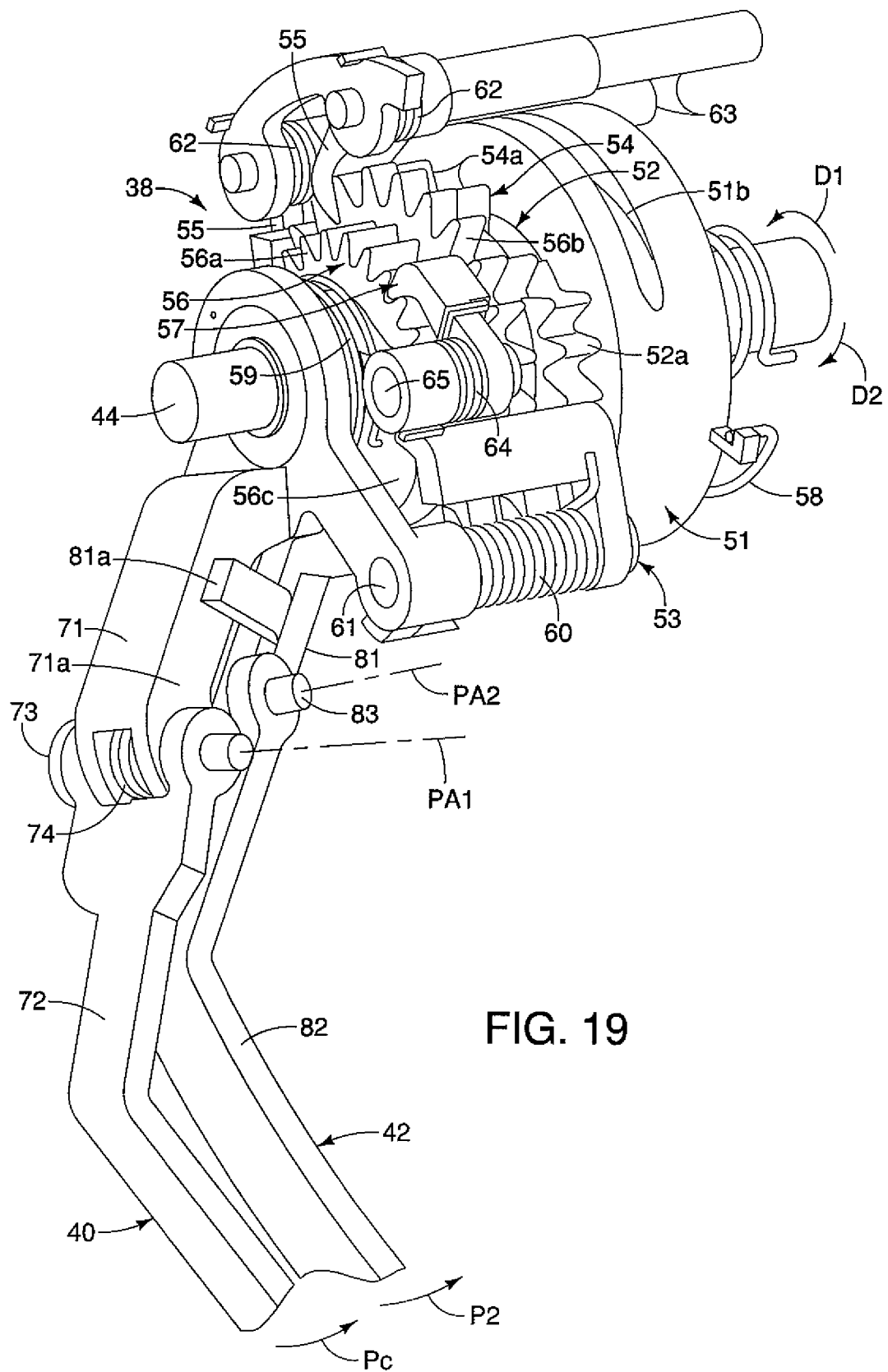
FIG. 19 is an enlarged partial perspective view of the shift control unit of the right bicycle component actuating (brake/shift) device.
Figure 20:
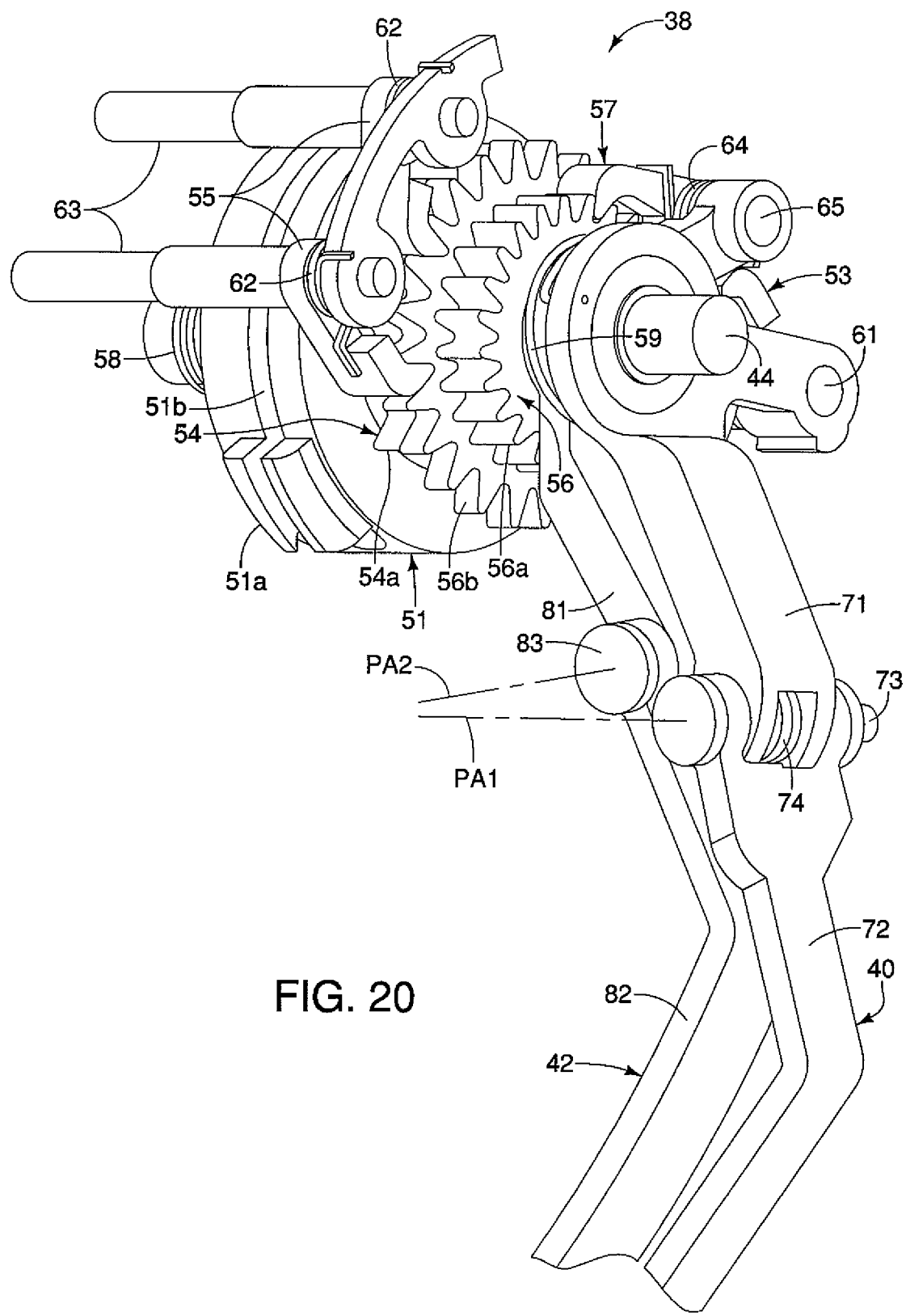
FIG. 20 is an enlarged partial perspective view of the shift control unit of the right bicycle component actuating (brake/shift) device.

The wire takeup member 51 is a wheel shaped member that has a peripheral edge with a cable attachment structure or point 51*a* and a wire receiving groove 51*b* as best seen in FIGS. 18 and 21. Thus, the wire takeup member 51 winds and unwinds the inner wire of the control cable 20 thereon.

The winding plate 52 is fixedly coupled to the wire takeup member 51 so as to rotate together. The winding plate 52 includes a plurality of winding teeth 52*a* that are selectively engaged by the winding pawl 53. The winding pawl 53 is pivotally mounted to the first operating lever 41, which in turn is pivotally mounted to the main pivot shaft 44. When the first operating lever 41 is moved from the first (rest) position to the second (shifting) position to operate the shift control unit 38, the winding pawl 53 engages the winding teeth 52a of the winding plate 52 to rotate the wire takeup member 51 in the wire pulling direction. The winding pawl 53 is normally urged towards engagement with the winding teeth 52a of the winding plate 52 by a biasing member 60. In this illustrated embodiment, the biasing member 60 is a torsion spring that is mounted on a pivot pin 61 which in turn attaches the winding pawl 53 to the first operating lever 41.

The positioning plate 54 cooperates with the positioning pawls 55 to maintain the wire takeup member 51 in one of a plurality of predetermined shift positions. In particular, the positioning plate 54 includes a plurality of positioning teeth 54a that are selectively engaged by the positioning pawls 55. Each of the positioning pawls 55 is normally urged towards engagement with the positioning teeth 54a of the positioning plate 54 by a biasing member 62. In this illustrated embodiment, the biasing members 62 are torsion springs that are mounted on pivot pins 63 which in turn attach the positioning pawls 55 to the base member 36. When the first operating lever 41 is moved from the first (rest) position to the second (shifting) position to operate the shift control unit 38, the positioning plate 54 is rotated so that the positioning teeth 54a of the positioning plate 54 move the positioning pawls 55 momentarily out of holding engagement with the positioning teeth 54a of the positioning plate 54. Thus, the positioning teeth 54a of the positioning plate 54 are ratchet teeth that are configured and arranged to ratchet the positioning pawls 55 when the wire takeup member 51 is rotated in the wire pulling direction.

The release plate 56 cooperate with the positioning pawls 55 to release the wire takeup member 51 so that the wire takeup member 51 rotates in the wire releasing direction due to the urging force of the return spring or biasing element 58 and a cable tension due to, for example, a pull force from the rear derailleur 18. In particular, the release plate 56 includes a plurality of driving teeth 56a, a plurality of release teeth 56b and a winding pawl disengagement portion 56c. The driving teeth 56a are selectively engaged by the release pawl 57, while the release teeth 56b selectively engage the positioning pawls 55. The winding pawl disengagement portion 56c moves the winding pawl 53 out of engagement with the winding teeth 52a of the winding plate 52 so that the winding plate 52 can rotate with respect to the winding pawl 53, when the second operating lever 42 is moved from the first (rest) position to the second (shifting) position to operate the shift control unit 38 in the wire releasing (unwinding) direction.

The release pawl 57 is normally urged towards engagement with the driving teeth 56a of the release plate 56 by a biasing member 64. In this illustrated embodiment, the biasing member 64 is a torsion spring that is mounted on a pivot pin 65 which in turn attaches the release pawl 57 to the second operating lever 42. When the second operating lever 42 is moved from the first (rest) position to the second (shifting) position to operate the shift control unit 38, the release plate 56 is rotated so that the release teeth 56b selectively engage the positioning pawls 55 to release the positioning plate 54. In particular, the release teeth 56b are ratchet teeth that are configured and arranged to ratchet the positioning pawls 55 when the release plate 56 is rotated in the first operating direction D1. Thus, the release plate 56 releases the wire takeup member 51 to rotates in a wire releasing direction due to the urging force of the return spring or biasing element 58 and the cable tension in response to movement of the second operating lever 42.

The control member 40 is pivotally mounted to the main pivot shaft 44 to move along an operating plane Pc. The operating plane Pc intersects with the non-shift (brake) operating plane or path BP (movement plane) of the first operating lever 41 and being parallel with the second operating plane P2. The control member 40 is located behind the first operating lever 41 and the control member 40 is located in front of the second operating lever 42, when the first and second operating levers 41 and 42 are in rest positions.

In particular, the control member 40 basically includes a first portion 71 operatively coupled to the shift control unit 38 and a second portion 72 spaced from the first portion 71. The first portion 71 is operatively coupled to the shift control unit 38. In particular, the first portion 71 of the control member 40 is pivotally connected to the shift control unit 38 about the pivot axis of the main pivot shaft 44 to operate the shift control unit 38 when the first operating lever 41 is operated along the first operating plane or path P1. The second portion 72 is spaced from the first portion 71 and contacts the rear surface of the first operating lever 41. Thus, the first operating lever 41 is slidably engaged with the second portion 72 of the control member 40 such that the second portion 72 of the control member 40 is moved when the first operating lever 40 is moved along the non-shift operating path BP with sliding contact therebetween.

Figure 13:
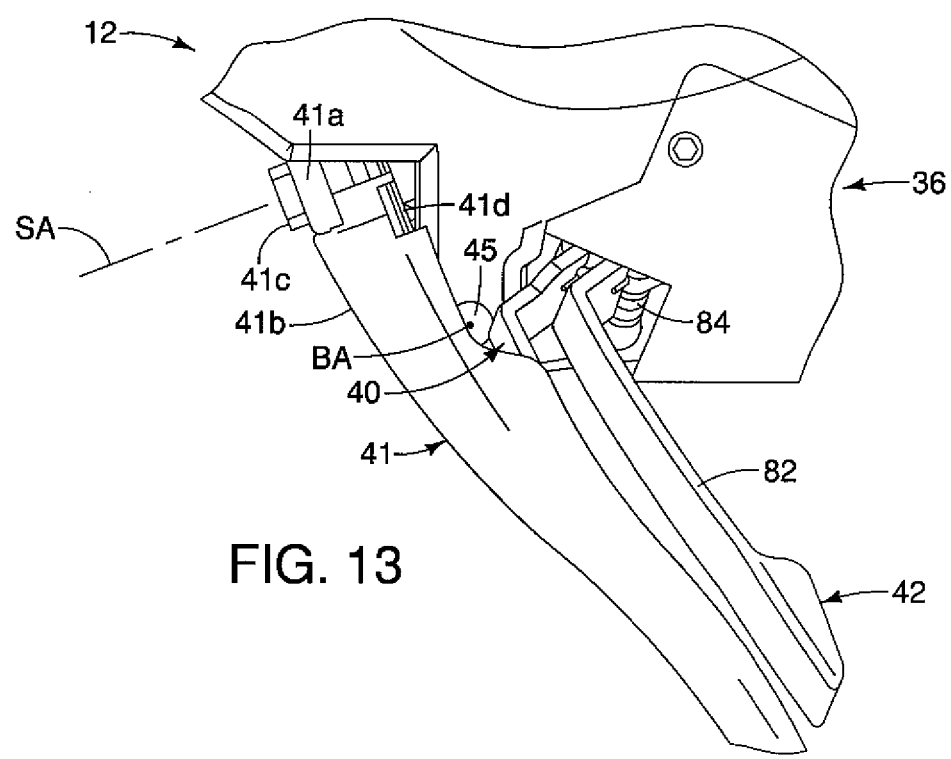
FIG. 13 is an enlarged partial inside elevational view of the right bicycle component actuating (brake/shift) device with the first operating lever moved to a shifting position such that the second operating lever moves with the first operating lever.
Figure 14:
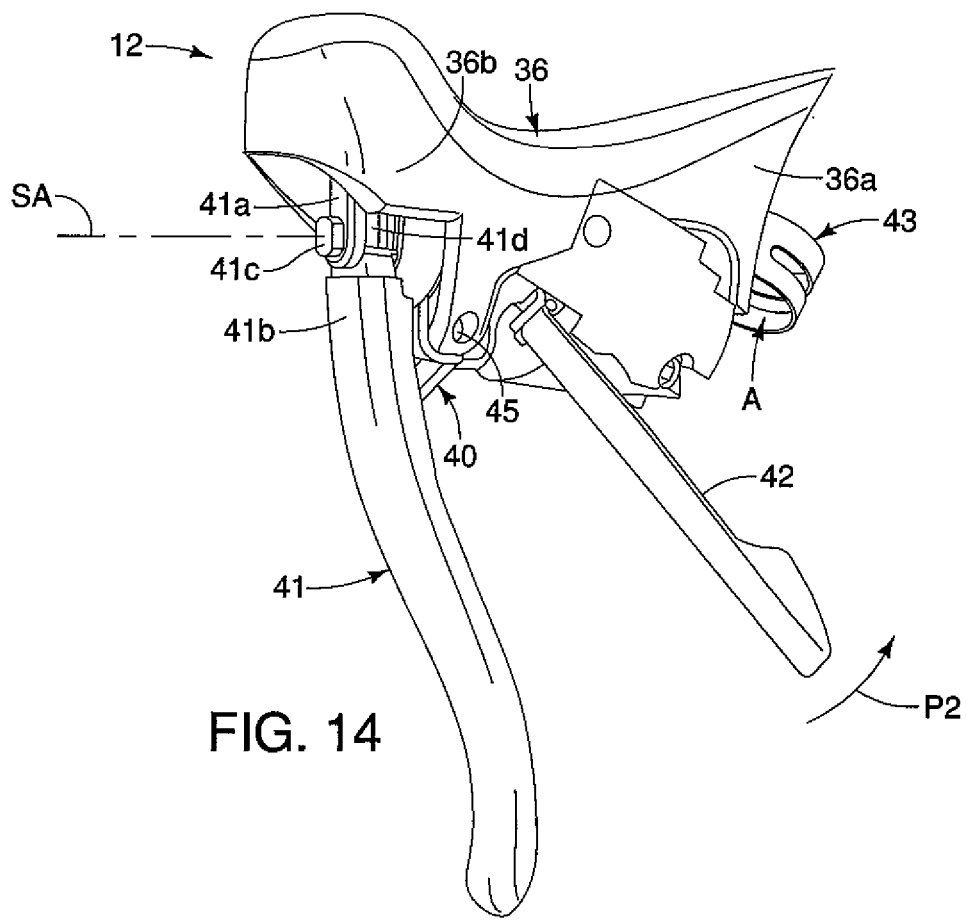
FIG. 14 is an inside perspective view of the right bicycle component actuating (brake/shift) device with the first operating lever in the rest position and the second operating lever moved to a shifting position.
Figure 15:
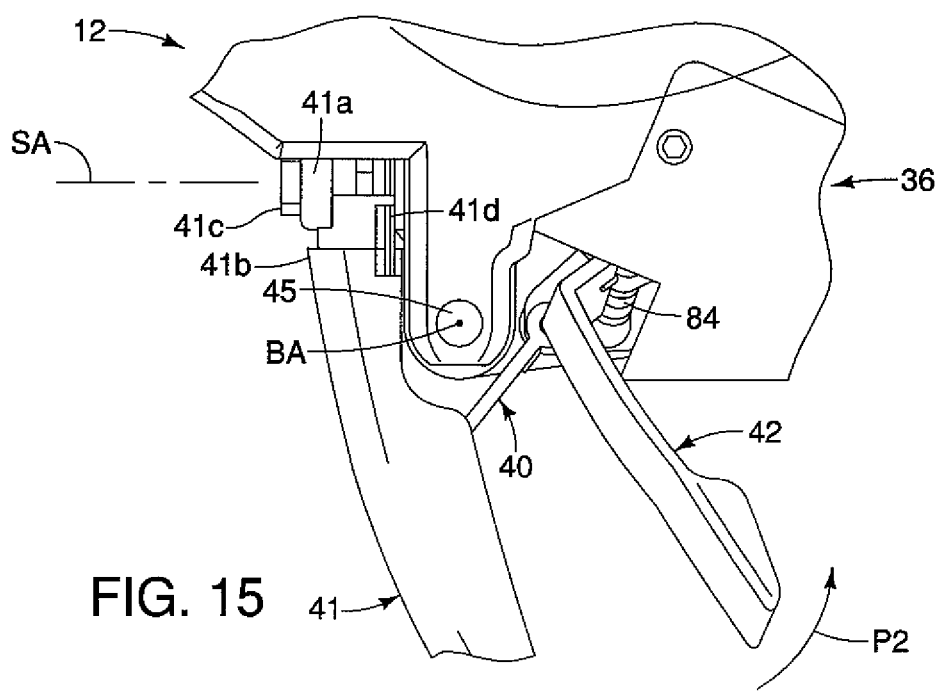
FIG. 15 is an enlarged partial inside elevational view of the right bicycle component actuating (brake/shift) device with the first operating lever in the rest position and the second operating lever moved to a shifting position.

A hinge pin 73 pivotally interconnecting the first and second portions 71 and 72 together to form the non-shift operating pivot axis PA1. A biasing element 74 is mounted on the hinge pin 73 to urge the second portion 72 forwardly with respect to the first portion 71 to a rest position. This intermediate hinge between the first and second portions 71 and 72 allows the second portion 72 to pivot rearwardly with respect to the first portion 71 such as when the first operating lever 41 is operated from the rest (non-braking) position to the braking position as seen in FIGS. 12 to 14. In other words, the control member 40 includes an intermediate hinge such that the second portion 72 of the control member 40 is pivoted in non-operating direction when the first operating lever 41 is operated.

The first portion 71 of the control member 40 has an abutment 71a (side surface) for moving the second operating lever 42 when the first operating lever 41 is operated. When the wire pulling operation is desired, the rider pushes the first operating lever 41 in a direction transverse to the non-shift (brake) operating plane or path BP (movement plane) of the first operating lever 41 along the first operating plane or path P1 from the first (rest) position to a second (shifting) position. This movement of the first operating lever 41 causes the control member 40 to move therewith to operate the shift control unit 38.

The second operating lever 42 is pivotally mounted to the main pivot shaft 44 to move along the second operating plane or path P2. The second operating plane P2 intersects with the non-shift (brake) operating plane or path BP (movement plane) of the first operating lever 41. The second operating lever 41 and the control member 40 pivot about a coincident pivot axis of the main pivot shaft 44 when performing shifting operations. The second operating lever 42 is located behind the first operating lever 41, when the first and second operating levers 41 and 42 are in rest positions.

In particular, the second operating lever 42 basically includes a first portion 81 operatively coupled to the shift control unit 38 and a second portion 82 spaced from the first portion 81. A hinge pin 83 pivotally interconnecting the first and second portions 81 and 82 together to form the non-shift operating pivot axis PA2. A biasing element 84 is mounted on the hinge pin 83 to urge the second portion 82 forwardly with respect to the first portion 81 to a rest position. This hinge between the first and second portions 81 and 82 allows the second portion 82 to pivot rearwardly with respect to the first portion 81 such as when the first operating lever 41 is operated from the rest (non-braking) position to the braking position as seen in FIGS. 12 to 15. In other words, the second operating lever 42 includes a hinge such that the second portion 82 of the second operating lever 42 is pivoted in a non-operating direction when the first operating lever 41 is operated.

The second portion 82 of the second operating lever 42 is pivotally mounted relative to the base member 36 to pivot from the rest position towards the handlebar receiving area A or the handlebar 16 about the non-shift operating pivot axis PA2 that is angled relative to the handlebar receiving area A such that the second portion 82 of the second operating lever 42 moves along the non-shift operating path BP' that avoid interference with the handlebar 16 in the lateral direction with respect to the handlebar receiving area A. Thus, when the first operating (brake) lever 41 is moved along the non-shift (brake) operating path BP, the second portion 82 of the second operating lever 42 pivots about a non-shift operating pivot axis PA2. The second portion 82 of the second operating lever 42 moves along the non-shift operating path BP' that is angled with respect to the reference plane RP that is perpendicular to the brake lever pivot axis BA and that contains the central handlebar mounting axis B. The second operating lever 42 is also independently movable with respect to the first operating (brake) lever 41. Thus, a rider can pivot the second operating lever 42 along the non-shift operating path BP', while the first operating (brake) lever 41 remains in the rest position and then operate the second operating lever 42 along a second operating plane or path P2.

The first portion 81 of the second operating lever 42 has an abutment 81a (flange) contacts the abutment 71a of the control member 40 such that the second operating lever 42 moves with the first operating lever 41 when the first operating lever 41 is operated. Thus, the abutments 71a and 81a are configured and arranged relative to each other such that the second operating lever 42 is moved by the first operating lever 41. The second portion 82 of the second operating lever 42 has a finger contact portion located at the end opposite the hinge for moving the second operating lever 42 about the main pivot shaft 44 of the shift control unit 38. When the wire releasing operation is desired, the rider pushes the finger contact portion of the second operating lever 42 in a direction transverse to the non-shift (brake) operating plane or path BP (movement plane) of the first operating lever 41 along the second operating plane or path P2 from the first (rest) position to a second (shifting) position to operate the shift control unit 38.

In the above discussed embodiment, the shift control unit 38 is illustrated as a cable operating shift control unit, which is merely one example of a shift control unit that can be used with the bicycle control device 12. In other words, the shift control unit for the bicycle control device 12 is not limited to a cable operating system, but rather other types of shift control units can be used with the bicycle control device 12 described and illustrated herein. For example, the shift control unit 38 can be replaced by an electrical shift control unit, or a pneumatic shift control unit, or hydraulic shift control unit. In the case of an electrical shift control unit, at least a pair of electrical switches would be provided for performing upshift and downshift operations in response to selective movements of the first and second operating levers 41 and 42. In the case of a pneumatic shift control unit or hydraulic shift control unit, a valve system would be provided for performing upshift and downshift operations in response to selective movements of the first and second operating levers 41 and 42.

General Interpretation of Terms

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle control device comprising:
   a base member including a handlebar mounting structure defining a handlebar receiving area with a central handlebar mounting axis;
   a shift control unit mounted to the base member; and
   an operating lever pivotally mounted relative to the base member to pivot from a rest position towards the handlebar receiving area about a non-shift operating pivot axis that is angled relative to the handlebar receiving area such that the operating lever moves along a non-shift operating path defining a non-shift operating plane that avoids intersection with a handlebar in a lateral direction with respect to the handlebar receiving area.

2. The bicycle control device according to claim 1, wherein the operating lever is operatively coupled to the shift control unit to operate the shift control unit when the operating lever is pivoted about a shift operating axis along a shift operating path.

3. The bicycle control device according to claim 2, further comprising
   a brake lever pivotally mounted relative to the base member about a brake lever pivot axis,
   the non-shift operating path of the operating lever being angled with respect to a reference plane that is perpendicular to the brake lever pivot axis and that contains the central handlebar mounting axis.

4. The bicycle control device according to claim 3, wherein the non-shift operating path of the operating lever lies along a plane that forms an angle that is less than forty-five degrees as measured from the reference plane to the operating lever.

5. The bicycle control device according to claim 3, wherein the operating lever is movably mounted to move along the non-shift operating path independent from the brake lever.

6. The bicycle control device according to claim 5, wherein,
the shift control unit includes a wire takeup member.

7. The bicycle control device according to claim 6, wherein the operating lever is configured and arranged relative to the wire takeup member such that the operating lever performs a wire releasing operation of the wire takeup member.

8. The bicycle control device according to claim 3, wherein the non-shift operating path of the operating lever is arranged such that the operating lever is located on a first lateral side of the reference plane of the base member when the operating lever is moved from the rest position towards the handlebar receiving area along the non-shift operating path of the operating lever, and
the shift operating path of the operating lever is arranged such that the operating lever is located on a second lateral side of the reference plane of the base member that is opposite the first lateral side when the operating lever is moved from the rest position along the shift operating path of the operating lever.

9. A bicycle control device comprising:
a base member including a handlebar mounting structure defining a handlebar receiving area with a central handlebar mounting axis;
a shift control unit mounted to the base member;
an operating lever pivotally mounted relative to the base member to pivot from a rest position towards the handlebar receiving area about a non-shift operating pivot axis that is angled relative to the handlebar receiving area such that the operating lever moves along a non-shift operating path from the rest position to an operated position and back to the rest position, and such that the operating lever avoids interference with a handlebar in a lateral direction with respect to the handlebar receiving area as the operating lever moves along the non-shift operating path from the rest position to the operated position; and
a brake lever pivotally mounted relative to the base member about a brake lever pivot axis,
the non-shift operating path of the operating lever being angled with respect to a reference plane that is perpendicular to the brake lever pivot axis and that contains the central handlebar mounting axis.

10. The bicycle control device according to claim 9, wherein
the operating lever is operatively coupled to the shift control unit to operate the shift control unit when the operating lever is pivoted about a shift operating axis along a shift operating path,
the non-shift operating path of the operating lever is arranged such that the operating lever is located on a first lateral side of the reference plane of the base member when the operating lever is moved from the rest position towards the handlebar receiving area along the non-shift operating path of the operating lever, and
the shift operating path of the operating lever is arranged such that the operating lever is located on a second lateral side of the reference plane of the base member that is opposite the first lateral side when the operating lever is moved from the rest position along the shift operating path of the operating lever.

11. The bicycle control device according to claim 9, wherein
the non-shift operating pivot axis of the operating lever and the brake lever pivot axis of the brake lever are non-parallel.

12. A bicycle control device comprising:
a base member including a handlebar mounting structure defining a handlebar receiving area with a central handlebar mounting axis;
a shift control unit mounted to the base member; and
an operating lever pivotally mounted relative to the base member to pivot from a rest position towards the handlebar receiving area about a first pivot axis that is angled relative to the handlebar receiving area such that the operating lever pivots about the first pivot axis to move along a first operating path from the rest position to an operated position and back to the rest position, the first operating path of the operating lever defining a first plane that is perpendicular to the first pivot axis,
the first pivot axis of the operating lever being arranged such that upon pivoting the operating lever about the first pivot axis, the operating lever moves in a direction primarily toward the handlebar receiving area of the handlebar mounting structure but laterally avoids intersection with the handlebar receiving area as the operating lever moves along the first operating path from the rest position to the operated position.

13. The bicycle control device according to claim 12, wherein
the operating lever is operatively coupled to the shift control unit to operate the shift control unit when the operating lever is pivoted about a second pivot axis along a second operating path that is non-coincident with the first operating path.

14. The bicycle control device according to claim 13, further comprising
a brake lever pivotally mounted relative to the base member about a brake lever pivot axis that is non-parallel to the first pivot axis,
the first operating path of the operating lever being angled with respect to a reference plane that is perpendicular to the brake lever pivot axis and that contains the central handlebar mounting axis.

15. The bicycle control device according to claim 14, wherein
the first operating path of the operating lever lies along a plane that forms an angle that is less than forty-five degrees as measured from the reference plane to the operating lever.

16. The bicycle control device according to claim 14, wherein
the operating lever is movably mounted to move along the first operating path independent from the brake lever.

17. The bicycle control device according to claim 16, wherein
the shift control unit includes a wire takeup member.

18. The bicycle control device according to claim 17, wherein the operating lever is configured and arranged relative to the wire takeup member such that the operating lever performs a wire releasing operation of the time takeup member.

19. The bicycle control device according to claim 14, wherein the first operating path of the operating lever is arranged such that the operating lever is located on a first lateral side of the reference plane of the base member when the operating lever is moved from the rest position towards the handlebar receiving area along the first operating path of the operating lever, and the second operating path of the operating lever is arranged such that the operating lever is located on a second lateral side of the reference plane of the base member that is opposite the first lateral side when the operating lever is moved from the rest position along the second operating path of the operating lever.

* * * * *